United States Patent
Seiler et al.

(10) Patent No.: US 12,204,484 B2
(45) Date of Patent: Jan. 21, 2025

(54) PRIMARY IP KVM DEVICES

(71) Applicant: Hewlett-Packard Development Company, L.P., Spring, TX (US)

(72) Inventors: Peter Andrew Seiler, Fort Collins, CO (US); Douglas A Reynolds, Fort Collins, CO (US); Eric John Gressman, Fort Collins, CO (US); Byron A Alcorn, Fort Collins, CO (US); J. Michael Stahl, Fort Collins, CO (US); Patrick S Anderson, Fort Collins, CO (US); Joseph-Jonathan Salzano, Fort Collins, CO (US); Gregory Mark Hughes, Fort Collins, CO (US); Clifton Joseph Robin, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 24 days.

(21) Appl. No.: 18/248,835

(22) PCT Filed: Oct. 22, 2020

(86) PCT No.: PCT/US2020/056813
§ 371 (c)(1),
(2) Date: Apr. 12, 2023

(87) PCT Pub. No.: WO2022/086534
PCT Pub. Date: Apr. 28, 2022

(65) Prior Publication Data
US 2023/0418777 A1     Dec. 28, 2023

(51) Int. Cl.
*G06F 13/10*     (2006.01)
*G06F 13/38*     (2006.01)
*G06F 13/42*     (2006.01)

(52) U.S. Cl.
CPC ........ *G06F 13/4282* (2013.01); *G06F 13/385* (2013.01); *G06F 2213/3808* (2013.01)

(58) Field of Classification Search
CPC ............... G06F 13/4282; G06F 13/385; G06F 2213/3808
See application file for complete search history.

(56) References Cited

U.S. PATENT DOCUMENTS 7,428,606 B2 *   9/2008   Liu ................... H04L 67/025
                                                              710/63
8,108,576 B2    1/2012   Shen et al.
(Continued)

FOREIGN PATENT DOCUMENTS

CN      200976129 Y   * 11/2007
CN      200993768 Y     12/2007
(Continued)

*Primary Examiner* — Cheng Yuan Tseng
(74) *Attorney, Agent, or Firm* — Knobbe, Martens, Olson & Bear, LLP (57) ABSTRACT

One example of an IP KVM device includes a USB port, a display port, a communication port, a network port, and a processor communicatively coupled to the USB port, display port, communication port, and network port. The USB port may be communicatively coupled to a host device to receive first USB signals from the host device. The display port may be communicatively coupled to the host device to receive first display signals from the host device. The communication port may be communicatively coupled to a secondary IP KVM device to receive second USB signals from the host device and second display signals from the host device. The network port may be communicatively coupled to a network. The processor is to aggregate the first and second USB signals and the first and second display signals and output the aggregated USB signals and display signals via the network port.

18 Claims, 6 Drawing Sheets

(56) References Cited

U.S. PATENT DOCUMENTS

| | | | |
|---|---|---|---|
| 8,332,523 B2* | 12/2012 | Weinstock | H04L 41/0886 |
| | | | 709/227 |
| 8,516,171 B2* | 8/2013 | Anderson | H04L 41/04 |
| | | | 710/316 |
| 9,258,366 B2* | 2/2016 | Lin | H04L 41/22 |
| 10,250,447 B2* | 4/2019 | Palmer | H04L 41/12 |
| 10,275,112 B2* | 4/2019 | Nagao | G06F 3/0481 |
| 11,237,999 B2* | 2/2022 | Whitney | G06F 13/4068 |
| 11,954,267 B2* | 4/2024 | Gressman | G06F 3/1423 |
| 12,032,762 B2* | 7/2024 | Reynolds | H04W 4/80 |
| 2006/0116023 A1* | 6/2006 | Spitaels | H04Q 1/023 |
| | | | 439/532 |
| 2008/0168118 A1* | 7/2008 | Hickey | G06F 13/385 |
| | | | 709/201 |
| 2008/0309584 A1 | 12/2008 | Zhang | |
| 2009/0077280 A1 | 3/2009 | Anderson et al. | |
| 2009/0150532 A1* | 6/2009 | Chan | H04L 12/413 |
| | | | 709/223 |
| 2009/0198848 A1 | 8/2009 | Chien | |
| 2009/0234990 A1 | 9/2009 | Shen et al. | |
| 2009/0265488 A1* | 10/2009 | Birger | H04L 49/35 |
| | | | 710/64 |
| 2010/0332580 A1 | 12/2010 | Hoerl et al. | |
| 2011/0161405 A1* | 6/2011 | He | H04L 41/042 |
| | | | 709/227 |
| 2012/0317181 A1 | 12/2012 | Husain et al. | |
| 2013/0136428 A1* | 5/2013 | Liu | H04N 5/765 |
| | | | 386/326 |
| 2015/0236512 A1* | 8/2015 | Whitney | G06F 13/4068 |
| | | | 307/80 |
| 2022/0156218 A1* | 5/2022 | Whitney | G06F 13/4068 |
| 2023/0418777 A1* | 12/2023 | Seiler | G06F 3/039 |

FOREIGN PATENT DOCUMENTS

| | | | | | |
|---|---|---|---|---|---|
| CN | 201285536 Y | * | 8/2009 | | |
| CN | 110071827 A | | 7/2019 | | |
| CN | 117395212 A | * | 1/2024 | | H04L 49/111 |
| JP | 2005018135 A | * | 1/2005 | | |
| TW | 201104431 A | | 2/2011 | | |
| TW | 201327150 A | * | 7/2013 | | |
| TW | 201721374 A | * | 6/2017 | | G06F 3/023 |

* cited by examiner

PRIMARY IP KVM DEVICES

BACKGROUND

Internet protocol (IP) keyboard, video, mouse (KVM) devices (e.g., dongles) may be used to enable a user to access a host device (e.g., server, workstation, computer, etc.) over a network. An IP KVM device may capture universal serial bus (USB) signals (e.g., keyboard signals, mouse signals, peripheral device signals, etc.) and video signals from the host device and encode them into packets for transmission over an ethernet link to a remote client device (e.g., computer). The remote client device may then decode the signals and output the video signals to a single display or multiple displays and use the USB signals for USB devices connected to the host device and/or the client device.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Internet protocol (IP) keyboard, video, mouse (KVM) devices typically support a limited number of inputs/outputs. This is primarily an artifact of the application specific integrated circuit (ASIC) design for such IP KVM devices being cost optimized to support a single display input, or at least a finite number of display inputs. A single IP KVM device that allows for additional IP KVM devices to be aggregated to a primary network connection can remove this restriction. By having additional IP KVM devices supplement the primary IP KVM device's network connection rather than having their own dedicated network connection, the primary IP KVM device can appear to support additional displays and USB devices.

Accordingly, as disclosed herein, a primary IP KVM device and a plurality of secondary IP KVM devices may be coupled to a host device (e.g., server, workstation, etc.) to support multiple USB and display connections to the host device. The primary IP KVM device may be coupled to an external network and to each of the secondary IP KVM devices. The primary IP KVM device may receive KVM signals (e.g., USB signals and display signals) directly from the host device and indirectly from the host device through each of the secondary IP KVM devices. The primary IP KVM device may aggregate the directly and indirectly received KVM signals from the host device and output the aggregated KVM signals to the external network. In this way, the primary IP KVM device appears on the external network as supporting the USB connections and the display connections of the primary and secondary IP KVM devices.

By allowing the IP KVM devices to be aggregated together, each secondary IP KVM device can add additional feature support to the primary IP KVM device. The number of secondary IP KVM devices that may support the primary IP KVM device may be limited by the combined processing power of the primary and secondary IP KVM devices and the network bandwidth between the primary and secondary IP KVM devices and the network bandwidth between the primary IP KVM device and the external network.

Figure 1A:
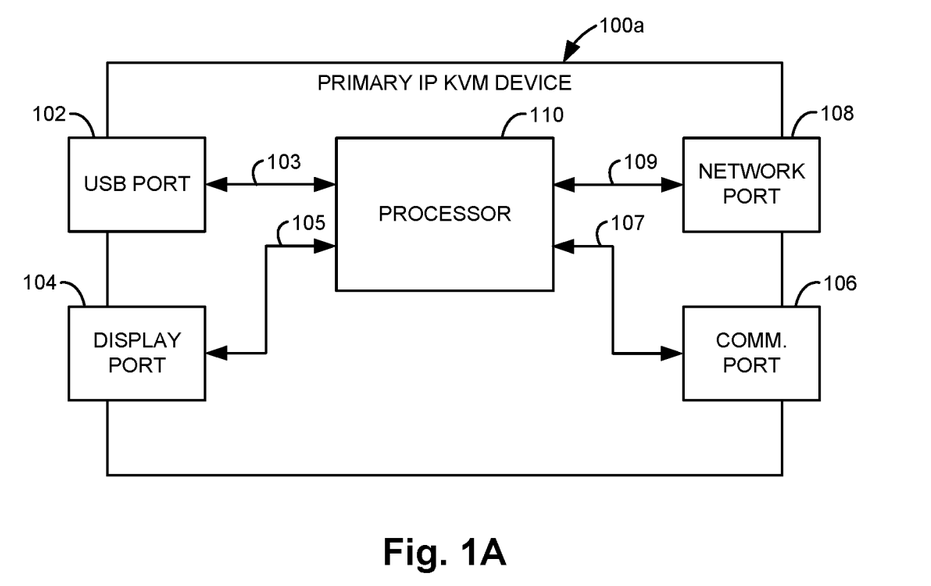
FIG. 1A is a block diagram illustrating one example of a primary internet protocol (IP) keyboard, video, mouse (KVM) device.

FIG. 1A is a block diagram illustrating one example of a primary IP KVM device 100a. Primary IP KVM device 100a includes a USB port 102, a display port 104 (e.g., digital visual interface (DVI) port, high-definition multimedia interface (HDMI) port, video graphics array (VGA) port, DisplayPort port), a communication port 106 (e.g., ethernet port, USB port, Thunderbolt port), a network port 108 (e.g., ethernet port), and a processor 110. The processor 110 is communicatively coupled to the USB port 102 through a communication path 103, to the display port 104 through a communication path 105, to the communication port 106 through a communication path 107, and to the network port 108 through a communication path 109.

As will be described in more detail below with reference to FIG. 2, the USB port 102 may be communicatively coupled to a host device (not shown) to receive first USB signals from the host device. The display port 104 may be communicatively coupled to the host device to receive first display signals from the host device. The communication port 106 may be communicatively coupled to a secondary IP KVM device (not shown) to receive second USB signals from the host device and second display signals from the host device via the secondary IP KVM device. The network port 108 may be communicatively coupled to a network (not shown).

The processor 110 may include a central processing unit (CPU), microprocessor, and/or other suitable logic circuitry for controlling the operation of the primary IP KVM device 100a. The processor 110 may aggregate the first USB signals and the second USB signals, aggregate the first display signals and the second display signals, and output the aggregated USB signals and the aggregated display signals via the network port 108. In one example, the processor 110 may implement a security protocol (e.g., encryption) for communications over the network. In this case, the processor 110 may include a security processor. The processor 110 may also manage the secondary IP KVM device (e.g., enable or disable the secondary IP KVM device, configure parameters of the secondary IP KVM device, etc.).

In one example, as will be described in more detail below with reference to FIGS. 3A and 3B, the communication port 106 may be communicatively coupled to a plurality of secondary IP KVM devices to receive USB signals from the host device and display signals from the host device via each of the plurality of secondary IP KVM devices. In this case, the processor 110 may aggregate the USB signals and the display signals from each of the plurality of secondary IP KVM devices and output the aggregated USB signals and display signals via the network port 108.

Figure 1B:
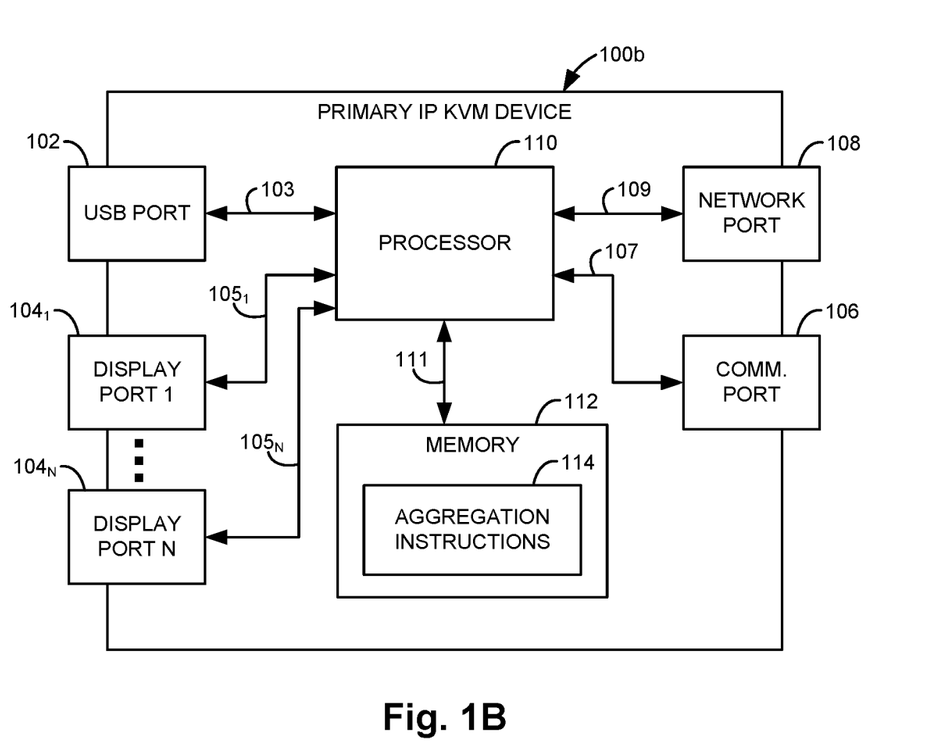
FIG. 1B is a block diagram illustrating another example of a primary IP KVM device.

FIG. 1B is a block diagram illustrating another example of a primary IP KVM device 100b. Primary IP KVM device 100b is similar to primary IP KVM device 100a previously described and illustrated with reference to FIG. 1A, except that primary IP KVM device 100b includes a plurality of display ports 104₁ to 104_N and a memory 112, where "N" is any suitable number of display ports (e.g., 2-4). Each of the plurality of display ports 104₁ to 104_N are communicatively coupled to the processor 110 through a communication path 105₁ to 105_N, respectively. Each of the plurality of display ports 104₁ to 104_N may be communicatively coupled to the host device (not shown) to receive respective display signals from the host device. The memory 112 is communicatively coupled to the processor 110 through a communication path 111. Memory 112 may store machine readable instructions (e.g., software and/or firmware) to be executed by processor 110 to control the operation of primary IP KVM device 100b. In one example, memory 112 stores aggregation instructions 114 to be executed by the processor 110 to aggregate the first and second USB signals and the first and second display signals and output the aggregated USB signals and display signals via the network port 108. Memory 112 may include a random access memory (RAM), a read-only memory (ROM), or a combination thereof.

Figure 2:
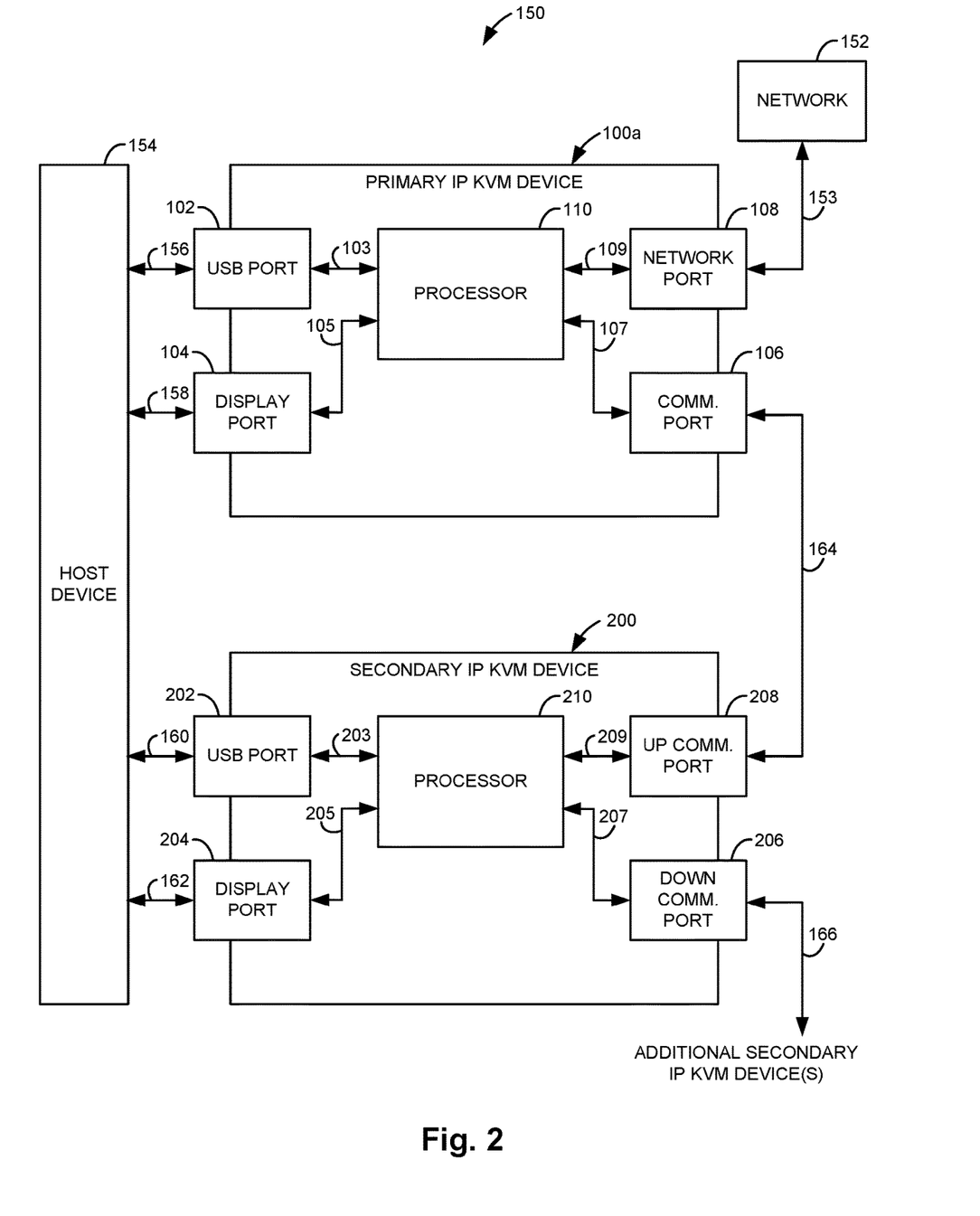
FIG. 2 is a block diagram illustrating one example of a system including a primary IP KVM device.

FIG. 2 is a block diagram illustrating one example of a system 150. System 150 includes a network 152, a host device 154, a primary IP KVM device 100a, and a secondary IP KVM device 200. Primary IP KVM device 100a was previously described and illustrated with reference to FIG. 1A. In one example, primary IP KVM device 100b previously described and illustrated with reference to FIG. 1B may be used in place of primary IP KVM device 100a in system 150.

Secondary IP KVM device 200 includes a USB port 202, a display port 204 (e.g., DVI port, HDMI port, VGA port, DisplayPort port), a downstream communication port 206 (e.g., ethernet port, USB port, Thunderbolt port), an upstream communication port 208 (e.g., ethernet port, USB port, Thunderbolt port), and a processor 210. The processor 210 is communicatively coupled to the USB port 202 through a communication path 203, to the display port 204 through a communication path 205, to the downstream communication port 206 through a communication path 207, and to the upstream communication port 208 through a communication path 209.

The USB port 102 of the primary IP KVM device 100a is communicatively coupled to the host device 154 through a communication path 156 to receive first USB signals from the host device 154. The display port 104 of the primary IP KVM device 100a is communicatively coupled to the host device 154 through a communication path 158 to receive first display signals from the host device 154. The communication port 106 of the primary IP KVM device 100a is communicatively coupled to the upstream communication port 208 of the secondary IP KVM device 200 through a communication path 164 to receive second USB signals from the host device 154 and second display signals from the host device 154 via the secondary IP KVM device 200. The network port 108 of the primary IP KVM device 100a is communicatively coupled to the network 152 through a communication path 153.

The USB port 202 of the secondary IP KVM device 200 is communicatively coupled to the host device 154 through a communication path 160 to receive second USB signals from the host device 154. The display port 204 of the secondary IP KVM device 200 is communicatively coupled to the host device 154 through a communication path 162 to receive second display signals from the host device 154. The downstream communication port 206 of the secondary IP KVM device 200 may be communicatively coupled to an upstream communication port of an additional secondary IP KVM device through a communication path 166 to receive additional USB signals from the host device 154 and additional display signals from the host device 154 via the additional secondary IP KVM device.

The processor 210 of the secondary IP KVM device 200 may include a CPU, microprocessor, and/or other suitable logic circuitry for controlling the operation of secondary IP KVM device 200. The processor 210 may receive the second USB signals from the host device 154 through USB port 202 and the second display signals from the host device 154 through display port 204 and transmit the second USB signals and the second display signals to the primary IP KVM device 100a through the upstream communication port 208. In addition, the processor 210 may receive additional USB signals and additional display signals from the host device 154 via an additional secondary IP KVM device through the downstream communication port 206 and transmit the additional USB signals and the additional display signals to the primary IP KVM device 100a through the upstream communication port 208. The second USB signals and the second display signals may be collectively referred to as second KVM signals. In one example, the processor 210 converts the second KVM signals to second KVM over IP signals prior to transmitting the signals to the primary IP KVM device 100a.

The first USB signals and the first display signals received from the host device 154 by primary IP KVM device 100a through USB port 102 and display port 104 may be collectively referred to as first KVM signals. In one example, the processor 110 converts the first KVM signals to first KVM over IP signals prior to aggregating the first KVM signals with the second KVM signals. The processor 110 aggregates the first KVM over IP signals and the second KVM over IP signals (and any additional KVM over IP signals from any additional secondary IP KVM devices) and outputs the aggregated KVM over IP signals to the network 152 over a single network connection 153. In one example, the aggregated KVM signals comprise multiple independent USB over IP streams and multiple independent display signal over IP streams. In other examples, the aggregated KVM signals comprise interleaved USB over IP streams and interleaved display signal over IP streams.

Figure 3A:
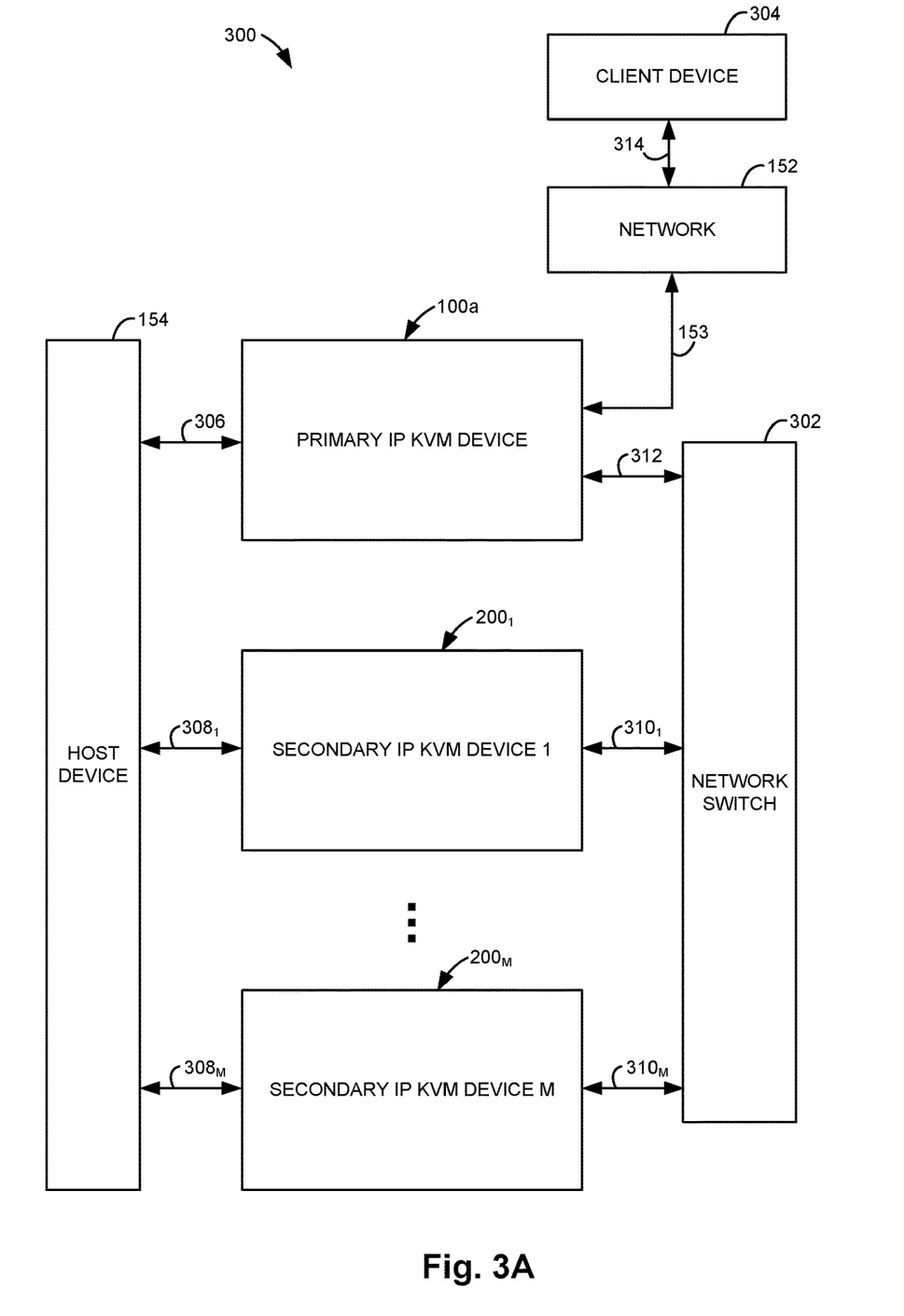
FIG. 3A is a block diagram illustrating another example of a system including a primary IP KVM device.

FIG. 3A is a block diagram illustrating another example of a system 300. System 300 includes a primary IP KVM device 100a, a plurality of secondary IP KVM devices 200₁ to 200_M, where "M" is any suitable number of secondary IP KVM devices, a network 152, a host device 154, a network switch 302, and a client device 304. Primary IP KVM device 100a was previously described and illustrated with reference to FIG. 1A. In one example, primary IP KVM device 100b previously described and illustrated with reference to FIG. 1B may be used in place of primary IP KVM device 100a in system 300. Each secondary IP KVM device 200₁ to 200_M may be similar to secondary IP KVM device 200 previously described and illustrated with reference to FIG. 2.

Host device 154 is communicatively coupled to primary IP KVM device 100a through a KVM communication path 306 (e.g., a USB signal path 156 and a display signal path 158 of FIG. 2) and to each secondary IP KVM device 200₁ to 200_M through a KVM communication path 3081 to 308M (e.g., a USB signal path 160 and a display signal path 162 of FIG. 2), respectively. Network switch 302 is communicatively coupled to primary IP KVM device 100a (e.g., via a communication port 106 of FIG. 2) through a communication path 312 and to each secondary IP KVM device $200_1$ to $200_M$ (e.g., via a communication port 206 or 208 of FIG. 2) through a communication path $310_1$ to $310_M$, respectively. In this example, each secondary IP KVM device $200_1$ to $200_M$ may include a single communication port for transmitting KVM signals to the primary IP KVM device 100a via switch 302. The client device 304 is communicatively coupled to the network 152 through a communication path 314.

Accordingly, the primary IP KVM device 100a is communicatively coupled between the host device 154 and the network 152. Each of the plurality of secondary IP KVM devices $200_1$ to $200_M$ is communicatively coupled between the host device 154 and the primary IP KVM device 100a. The primary IP KVM device 100a aggregates KVM signals received directly from the host device 154 and KVM signals received from the host device 154 through each of the plurality of secondary IP KVM devices $200_1$ to $200_M$ and outputs the aggregated KVM signals to the network 152. In this example, the network switch 302 communicatively couples each of the plurality of secondary IP KVM devices $200_1$ to $200_M$ to the primary IP KVM device 100a.

The client device 304 receives the aggregated KVM signals (e.g., aggregated KVM over IP signals) from the primary IP KVM device 100a and decodes the aggregated KVM signals. The client device 304 communicates with a single IP KVM device, that is, the primary IP KVM device 100a, which appears to the client device 304 as supporting the USB connections and display connections coupled to the primary IP KVM device 100a and each of the secondary IP KVM devices $200_1$ to $200_M$. The client device 304 may display the multiple display streams received from the primary IP KVM device 100a on multiple displays. The USB traffic passed through the primary IP KVM device 100a may be used for USB devices on the host device 154 and/or on the client device 304.

Figure 3B:
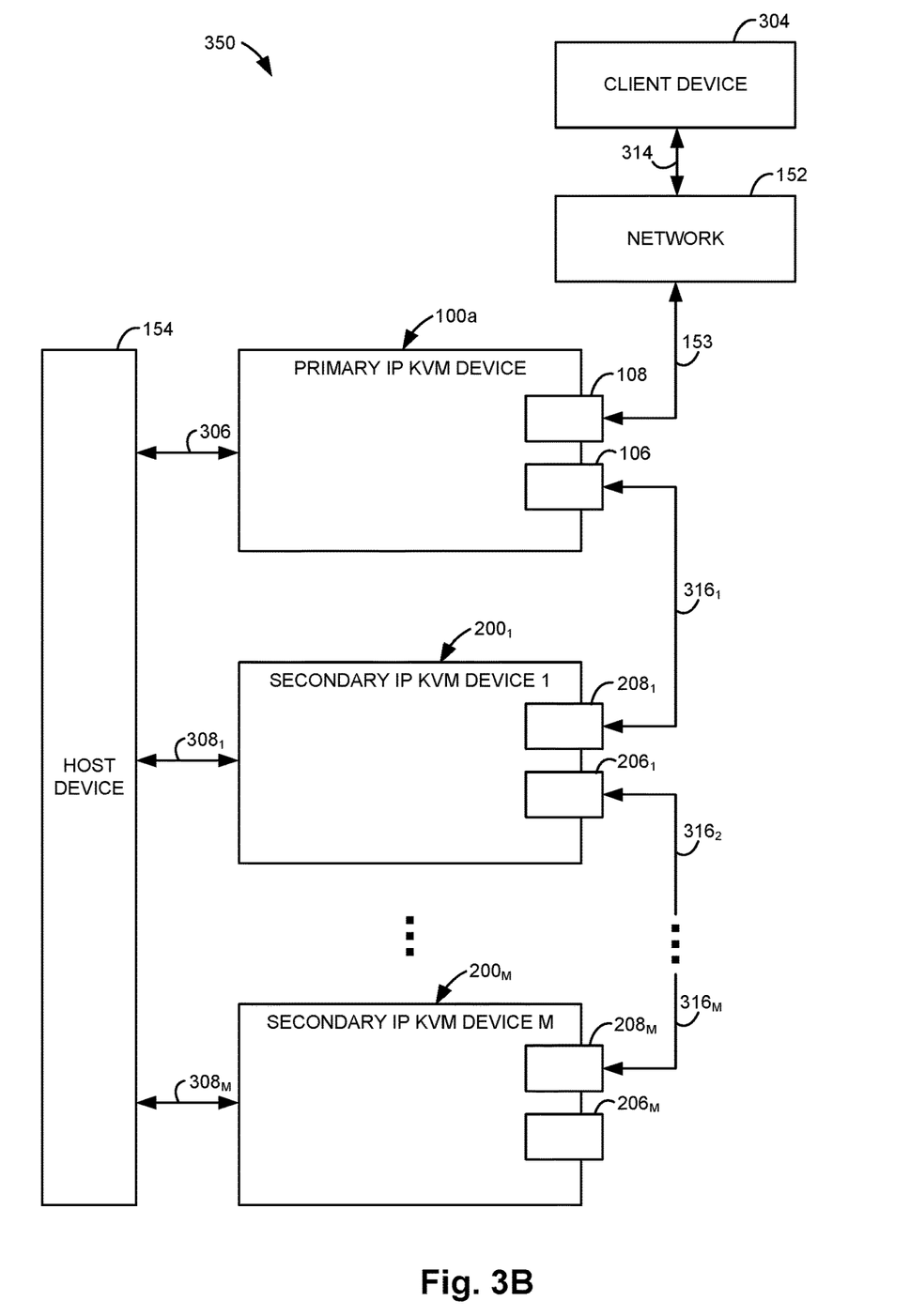
FIG. 3B is a block diagram illustrating another example of a system including a primary IP KVM device.

FIG. 3B is a block diagram illustrating another example of a system 350. System 350 includes a primary IP KVM device 100a, a plurality of secondary IP KVM devices $200_1$ to $200_M$, a network 152, a host device 154, and a client device 304. Primary IP KVM device 100a was previously described and illustrated with reference to FIG. 1A. In one example, primary IP KVM device 100b previously described and illustrated with reference to FIG. 1B may be used in place of primary IP KVM device 100a in system 350. Each secondary IP KVM device $200_1$ to $200_M$ may be similar to secondary IP KVM device 200 previously described and illustrated with reference to FIG. 2. In this example, the primary IP KVM device 100a and each secondary IP KVM device $200_1$ to $200_M$ may be identical, while the primary IP KVM device 100a may be configured (e.g., via firmware and/or software) to operate in a primary mode of operation and each secondary IP KVM device $200_1$ to $200_M$ may be configured (e.g., via firmware and/or software) to operate in a secondary mode of operation.

In this example, the primary IP KVM device 100a includes an upstream communication port 108 (e.g., a network port) and a downstream communication port 106 (e.g., a network port). Likewise, each secondary IP KVM device $200_1$ to $200_M$ includes an upstream communication port (e.g., network port) $208_1$ to $208_M$ and a downstream communication port (e.g., network port) $206_1$ to $206_M$, respectively. The plurality of secondary IP KVM devices $200_1$ to $200_M$ are communicatively coupled to the primary IP KVM device 100a in a daisy chain configuration via the upstream communication ports $208_1$ to $208_M$ and the downstream communication ports $206_1$ to $206_M$. That is, the upstream communication port 108 of the primary IP KVM device 100a is communicatively coupled to the network 152. The downstream communication port 106 of the primary IP KVM device 100a is communicatively coupled to the upstream communication port $208_1$ of the first secondary IP KVM device $200_1$ through a communication path $316_1$. The downstream communication port $206_1$ of the first secondary IP KVM device $200_1$ is communicatively coupled to the upstream communication port $208_2$ of the second secondary IP KVM device $200_2$ (not shown) through a communication path $316_2$, etc. The downstream communication port $206_{M-1}$ of the second to last secondary IP KVM device $200_{M-1}$ (not shown) is communicatively coupled to the upstream communication port $208_M$ of the last secondary IP KVM device $200_M$ through a communication path $316_M$. The downstream communication port $206_M$ of the last secondary IP KVM device $200_M$ is not used.

Figure 4A:
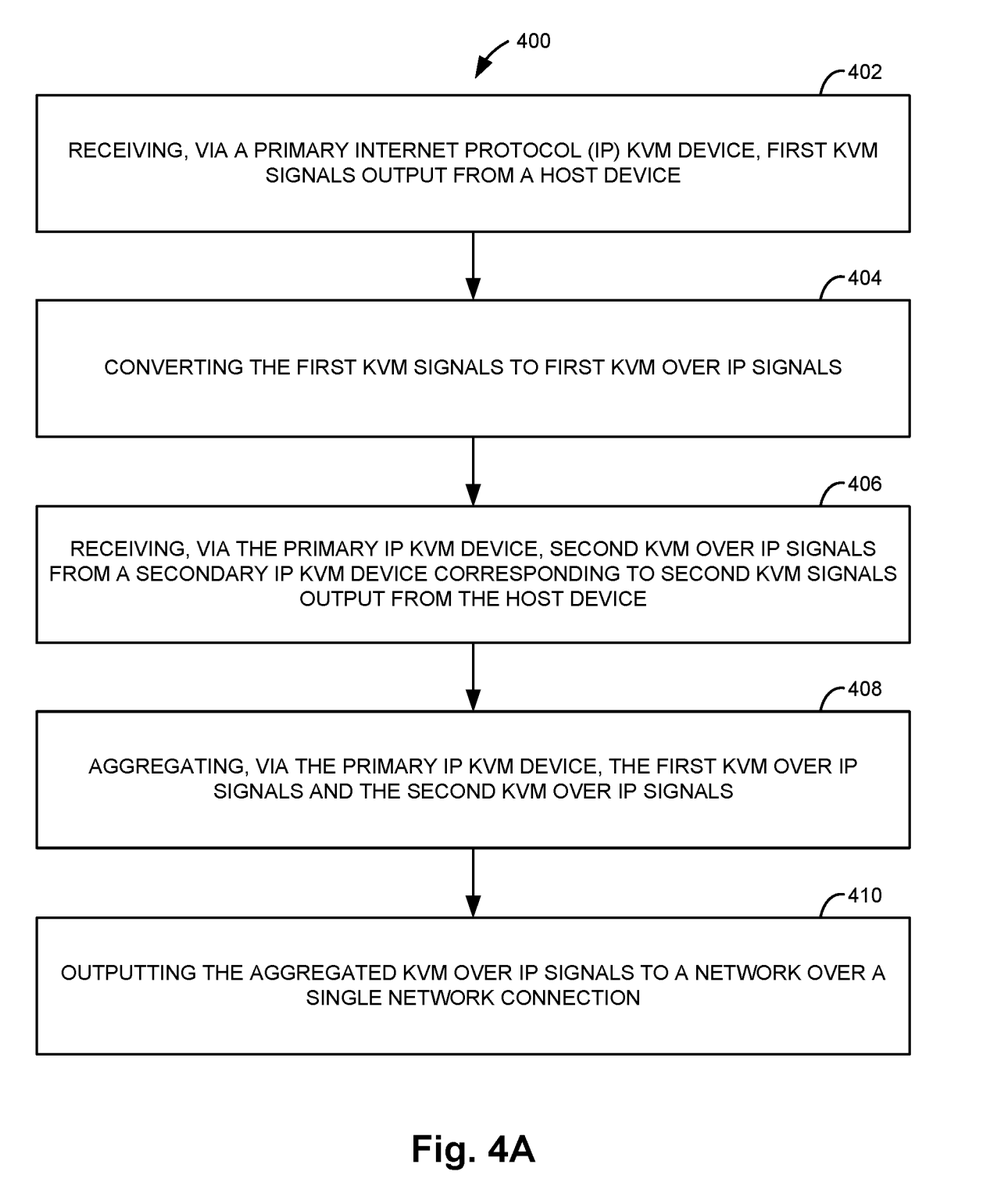
FIGS. 4A-4C are flow diagrams illustrating one example of a method for aggregating KVM signals for output to a network.
Figure 4B:
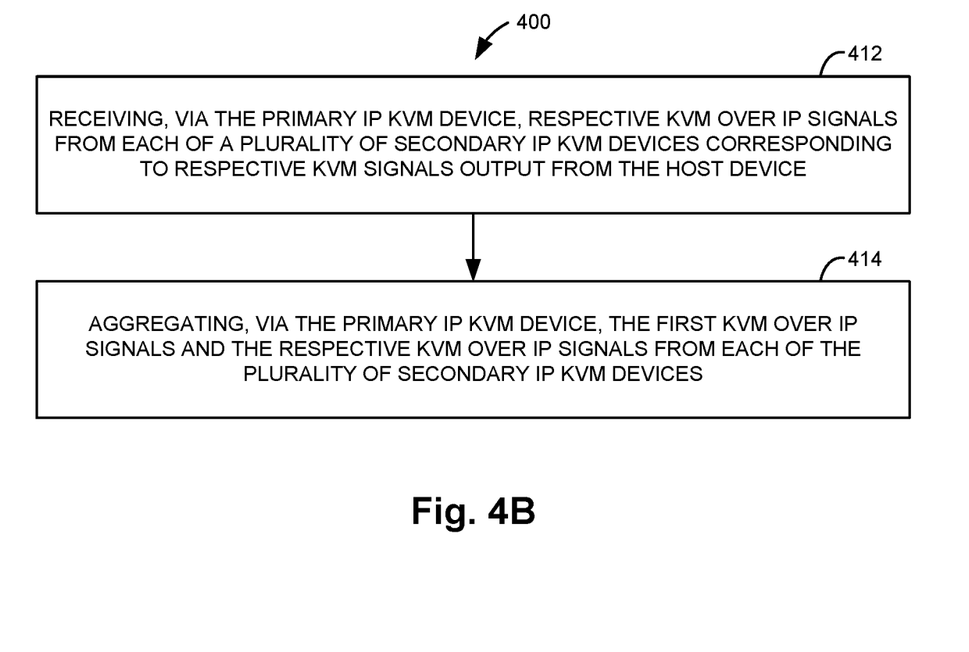
Figure 4C:
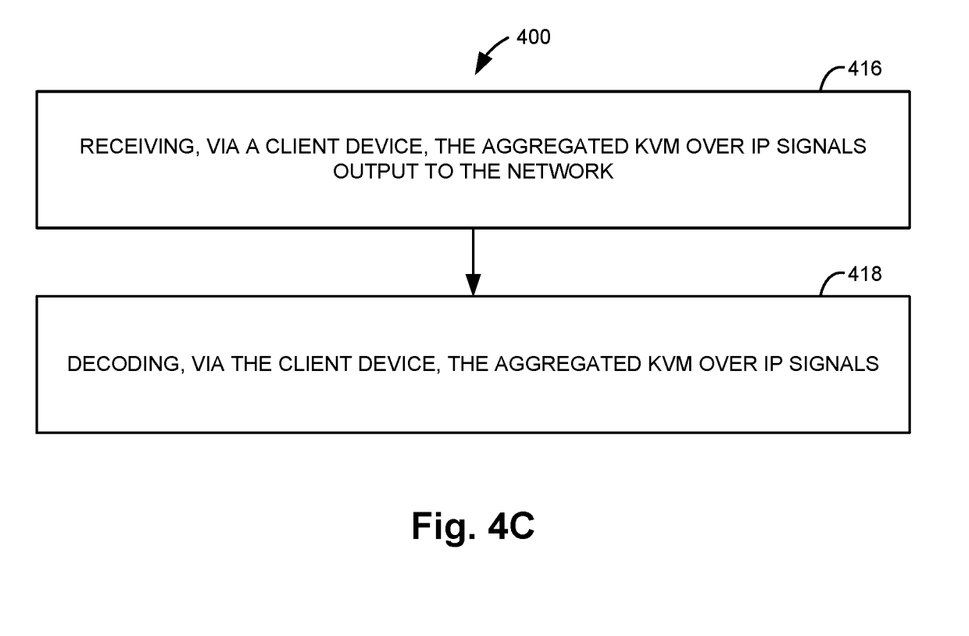

FIGS. 4A-4C are flow diagrams illustrating one example of a method 400 for aggregating KVM signals for output to a network (e.g., network 152). As illustrated in FIG. 4A at 402, method 400 includes receiving, via a primary internet protocol (IP) KVM device (e.g., primary IP KVM device 100a or 100b), first KVM signals output from a host device (e.g., host device 154). At 404, method 400 includes converting the first KVM signals to first KVM over IP signals (e.g., via a processor 110). At 406, method 400 includes receiving, via the primary IP KVM device, second KVM over IP signals from a secondary IP KVM device (e.g., a secondary IP KVM device 200) corresponding to second KVM signals output from the host device. At 408, method 400 includes aggregating, via the primary IP KVM device (e.g., via a processor 110), the first KVM over IP signals and the second KVM over IP signals. At 410, method 400 includes outputting the aggregated KVM over IP signals to a network over a single network connection (e.g., network connection 153).

As illustrated in FIG. 4B at 412, method 400 may further include receiving, via the primary IP KVM device, respective KVM over IP signals from each of a plurality of secondary IP KVM devices (e.g., secondary IP KVM devices $200_1$ to $200_M$) corresponding to respective KVM signals output from the host device. At 414, method 400 may further include aggregating, via the primary IP KVM device, the first KVM over IP signals and the respective KVM over IP signals from each of the plurality of secondary IP KVM devices.

As illustrated in FIG. 4C at 416, method 400 may further include receiving, via a client device (e.g., client device 304), the aggregated KVM over IP signals output to the network. At 418, method 400 may further include decoding, via the client device (e.g., via a processor of the client device), the aggregated KVM over IP signals.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A primary internet protocol (IP) keyboard, video, mouse (KVM) device comprising:

a universal serial bus (USB) port to be communicatively coupled to a host device to receive first USB signals from the host device;
a display port to be communicatively coupled to the host device to receive first display signals from the host device;
a communication port to be communicatively coupled to a secondary IP KVM device to receive second USB signals from the host device and second display signals from the host device via the secondary IP KVM device;
a network port to be communicatively coupled to a network; and
a processor communicatively coupled to the USB port, the display port, the communication port, and the network port, the processor to:
aggregate the first and second USB signals and the first and second display signals; and
output the aggregated USB signals and display signals via the network port as multiple display streams for display on multiple displays.

2. The primary IP KVM device of claim 1, wherein the communication port is to be communicatively coupled to a plurality of secondary IP KVM devices to receive USB signals from the host device and display signals from the host device via each of the plurality of secondary IP KVM devices, and
wherein the processor is to aggregate the USB signals and the display signals from each of the plurality of secondary IP KVM devices.

3. The primary IP KVM device of claim 1, further comprising:
a plurality of display ports, each of the plurality of display ports to be communicatively coupled to the host device to receive respective display signals from the host device.

4. The primary IP KVM device of claim 1, wherein the processor is to implement a security protocol for communications over the network.

5. The primary IP KVM device of claim 1, wherein the processor is to manage the secondary IP KVM device.

6. The primary IP KVM device of claim 1, further comprising:
a memory storing machine readable instructions to be executed by the processor to aggregate the first and second USB signals and the first and second display signals and output the aggregated USB signals and display signals via the network port.

7. A system comprising:
a network;
a host device;
a primary internet protocol (IP) keyboard, video, mouse (KVM) device communicatively coupled between the host device and the network; and
a plurality of secondary IP KVM devices, each of the plurality of secondary IP KVM devices communicatively coupled between the host device and the primary IP KVM device,
wherein the primary IP KVM device is to aggregate KVM signals received directly from the host device and KVM signals received from the host device through each of the plurality of secondary IP KVM devices and output the aggregated KVM signals to the network as multiple display streams for display on multiple displays.

8. The system of claim 7, further comprising:
a network switch communicatively coupling each of the plurality of secondary IP KVM devices to the primary IP KVM device.

9. The system of claim 7, wherein each of the plurality of secondary IP KVM devices comprises an upstream port and a downstream port and the plurality of secondary IP KVM devices are communicatively coupled to the primary IP KVM device in a daisy chain configuration via the upstream ports and the downstream ports.

10. The system of claim 7, wherein the aggregated KVM signals comprise multiple independent USB over IP streams and multiple independent display signal over IP streams.

11. The system of claim 7, wherein the aggregated KVM signals comprise interleaved USB over IP streams and interleaved display signal over IP streams.

12. The system of claim 7, wherein the primary IP KVM device and each of the plurality of secondary IP KVM devices are identical.

13. A method for aggregating keyboard, video, mouse (KVM) signals for output to a network, the method comprising:
receiving, via a primary internet protocol (IP) KVM device, first KVM signals output from a host device;
converting the first KVM signals to first KVM over IP signals;
receiving, via the primary IP KVM device, second KVM over IP signals from a secondary IP KVM device corresponding to second KVM signals output from the host device;
aggregating, via the primary IP KVM device, the first KVM over IP signals and the second KVM over IP signals; and
outputting the aggregated KVM over IP signals to a network over a single network connection as multiple display streams for display on multiple displays.

14. The method of claim 13, further comprising:
receiving, via the primary IP KVM device, respective KVM over IP signals from each of a plurality of secondary IP KVM devices corresponding to respective KVM signals output from the host device; and
aggregating, via the primary IP KVM device, the first KVM over IP signals and the respective KVM over IP signals from each of the plurality of secondary IP KVM devices.

15. The method of claim 13, further comprising:
receiving, via a client device, the aggregated KVM over IP signals output to the network; and
decoding, via the client device, the aggregated KVM over IP signals.

16. The primary IP KVM device of claim 1, wherein the processor is to manage the secondary IP KVM device by enabling or disabling the secondary IP KVM device.

17. The system of claim 7, further comprising a processor to manage the plurality of secondary IP KVM devices by enabling or disabling the plurality of secondary IP KVM devices.

18. The method of claim 13, further comprising managing the secondary IP KVM device by enabling the secondary IP KVM device.

* * * * *